(12) United States Patent
Staub

(10) Patent No.: US 9,522,432 B2
(45) Date of Patent: Dec. 20, 2016

(54) CRADLE CUTTER

(71) Applicant: Herbert W. Staub, Solon, OH (US)

(72) Inventor: Herbert W. Staub, Solon, OH (US)

(*) Notice: Subject to any disclaimer, the term of this patent is extended or adjusted under 35 U.S.C. 154(b) by 254 days.

(21) Appl. No.: 13/792,315

(22) Filed: Mar. 11, 2013

(65) Prior Publication Data

US 2014/0082948 A1 Mar. 27, 2014

Related U.S. Application Data

(60) Provisional application No. 61/689,226, filed on Jun. 1, 2012.

(51) Int. Cl.
*B23D 61/00* (2006.01)
*B23D 65/00* (2006.01)
*B24B 23/04* (2006.01)

(52) U.S. Cl.
CPC ............ *B23D 61/006* (2013.01); *B23D 65/00* (2013.01); *B24B 23/04* (2013.01)

(58) Field of Classification Search
CPC ........... B26B 9/02; B23D 61/00; B23D 65/00; B24B 23/04
USPC ............................ 30/392–394, 355, 346, 357
See application file for complete search history.

(56) References Cited

U.S. PATENT DOCUMENTS

| 959,054 | A | * | 5/1910 | Glover | 451/530 |
| 1,919,748 | A | * | 7/1933 | Roberts | B23D 61/121 |
| | | | | | 30/166.3 |
| 5,219,378 | A | | 6/1993 | Arnold | |
| 5,403,318 | A | * | 4/1995 | Boehringer et al. | 606/82 |
| 5,590,469 | A | | 1/1997 | Hoover et al. | |
| 5,697,835 | A | * | 12/1997 | Nitz et al. | 451/548 |
| 5,893,212 | A | | 4/1999 | Meister | |
| 6,171,354 | B1 | | 1/2001 | Johnson | |
| 6,413,133 | B1 | | 7/2002 | McCarthy | |
| 6,658,740 | B2 | | 12/2003 | Habben | |
| 6,817,936 | B1 | * | 11/2004 | Skeem | B23D 61/18 |
| | | | | | 125/13.01 |
| 6,923,821 | B2 | | 8/2005 | Wortrich | |

(Continued)

FOREIGN PATENT DOCUMENTS

| CN | 202317976 | 7/2012 |
| CN | 202317977 | 7/2012 |

(Continued)

OTHER PUBLICATIONS

Oscillating multi tool saw blade for Craftsman Nextec Dremel Multi-Max Genesis; www.ebay.com; Feb. 18, 2013.

(Continued)

*Primary Examiner* — Sean Michalski
*Assistant Examiner* — Liang Dong
(74) *Attorney, Agent, or Firm* — Hahn Loeser & Parks LLP

(57) ABSTRACT

The claimed subject matter provides a cutting head for oscillating tools including a concave or recessed cutting edge. The cutting edge can be a recessed curve, an angular recess, or a combination of the two. The cutting edge can include one or more of serrations or cutting grit. The cutting head can conform to a variety of work piece geometries and cradle the work piece during cutting to prevent slipping and provide faster cuts by applying a greater proportion of the blade to the work piece at once and retaining the work piece between sides of the recess.

13 Claims, 4 Drawing Sheets

(56) References Cited

U.S. PATENT DOCUMENTS

| | | | |
|---|---|---|---|
| 7,210,388 B2* | 5/2007 | Pacher | B23D 61/127 30/345 |
| 8,261,455 B2 | 9/2012 | Henrickson | |
| 8,267,603 B2 | 9/2012 | Morita et al. | |
| 8,342,917 B2 | 1/2013 | Byrd | |
| 8,360,729 B2 | 1/2013 | Yagami et al. | |
| 2002/0104421 A1* | 8/2002 | Wurst | B23D 61/006 83/835 |
| 2002/0133186 A1* | 9/2002 | Kullmer | 606/178 |
| 2003/0014869 A1 | 1/2003 | Rack | |
| 2004/0164570 A1 | 8/2004 | Souza, Jr. | |
| 2004/0225307 A1 | 11/2004 | Wortrich | |
| 2006/0137498 A1* | 6/2006 | Bowling | B23D 49/11 83/13 |
| 2007/0123893 A1* | 5/2007 | O'Donoghue | 606/82 |
| 2008/0172892 A1* | 7/2008 | Henrickson | B23D 45/003 30/392 |
| 2008/0190259 A1* | 8/2008 | Bohne | 83/666 |
| 2009/0013846 A1 | 1/2009 | Morita et al. | |
| 2010/0218389 A1* | 9/2010 | Kalomeris | B23D 61/128 30/392 |
| 2011/0219929 A1* | 9/2011 | Mann | 83/607 |
| 2011/0247847 A1 | 10/2011 | Holmes et al. | |
| 2012/0190283 A1 | 7/2012 | Byrd | |
| 2012/0324744 A1 | 12/2012 | Henrickson | |

FOREIGN PATENT DOCUMENTS

| | | |
|---|---|---|
| CN | 102689292 | 9/2012 |
| DE | 4140836 | 6/1993 |
| DE | 69205809 | 3/1996 |
| DE | 19613538 | 7/1997 |
| DE | 69524905 | 8/2002 |
| EP | 1190800 | 3/2002 |
| FR | 2848169 | 11/2004 |
| GB | 2321618 | 5/1998 |
| JP | 5103882 | 4/1993 |
| JP | 5276870 | 10/1993 |
| JP | 928149 | 2/1997 |
| JP | 2001158002 | 6/2001 |
| JP | 2001179536 | 7/2001 |
| JP | 2001284007 | 10/2001 |
| JP | 2007203390 | 8/2007 |
| JP | 2010161943 | 7/2010 |
| JP | 2011131317 | 7/2011 |
| WO | 0035586 | 6/2000 |
| WO | 03009959 | 2/2003 |
| WO | 2004065076 | 8/2004 |
| WO | 20071431831 | 11/2007 |
| WO | 2008091969 | 7/2008 |
| WO | 2012152458 | 11/2012 |

OTHER PUBLICATIONS

Toolmonger, A Scraper for all Occasions; Benjamin Johnson on Mar. 8, 2011; http://toolmonger.com; Feb. 18, 2013.

Draper Toolbox; Draper Concave Blade Soft Mat product description; http://www.drapertoolbox.com; Feb. 18, 2013.

Flush Cut Concave Segment Knife Edge Scraper; http://multifitblades.com; Feb. 18, 2013.

Stainless Steel Flush Cut Knife Edge Concave Scraper Blade; http://www.products-supplies.com; Feb. 18, 2013.

Kent Supplies; Concave Stainless Steel Scraper Blade; http://www.kentsupplies.com; Feb. 18, 2013.

* cited by examiner

CRADLE CUTTER

CROSS-REFERENCE TO RELATED APPLICATIONS

This application is a Continuation application that claims the benefit of U.S. Provisional Patent Application No. 61/689,226, entitled "CRADLE CULTER BLADE SURE CUT" and filed on Jun. 1, 2012. The entirety of the aforementioned application is incorporated herein by reference.

SUMMARY

In general, the invention relates to a concave cutting blade. More particularly, the invention relates to a concave cutting blade for an oscillating tool. Most particularly, the invention relates to an interchangeable concave cutting blade including a serrated or grit surface along the forward-facing concave.

The invention relates to at least an oscillating tool head with a concave or recessed cutting surface. In an embodiment A cutting head for use with an oscillating tool, comprising a cutting blade disposed on a recess oriented to a front direction of the oscillating tool and an interface configured to facilitate attachment of the cutting head and the oscillating tool.

In alternative or complementary embodiments, an apparatus can include at least working plane including a concave cutting portion, wherein the concave cutting portion is oriented on a tool direction end of the working plane, and wherein the cutting concave portion has applied at least one of a saw tooth pattern and a cutting grit. The apparatus can further include an interface plane including at least an oscillating tool interface configured to couple the apparatus to an oscillating tool, and a step plane disposed between the working plane and the interface plane including a first step angle and a second step angle that offsets the working plane from the interface plane.

The invention can further relate to A method of manufacturing a cutting head, comprising at least forming a recess oriented toward a to tool direction and applying a cutting surface to at least the recess.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1A:
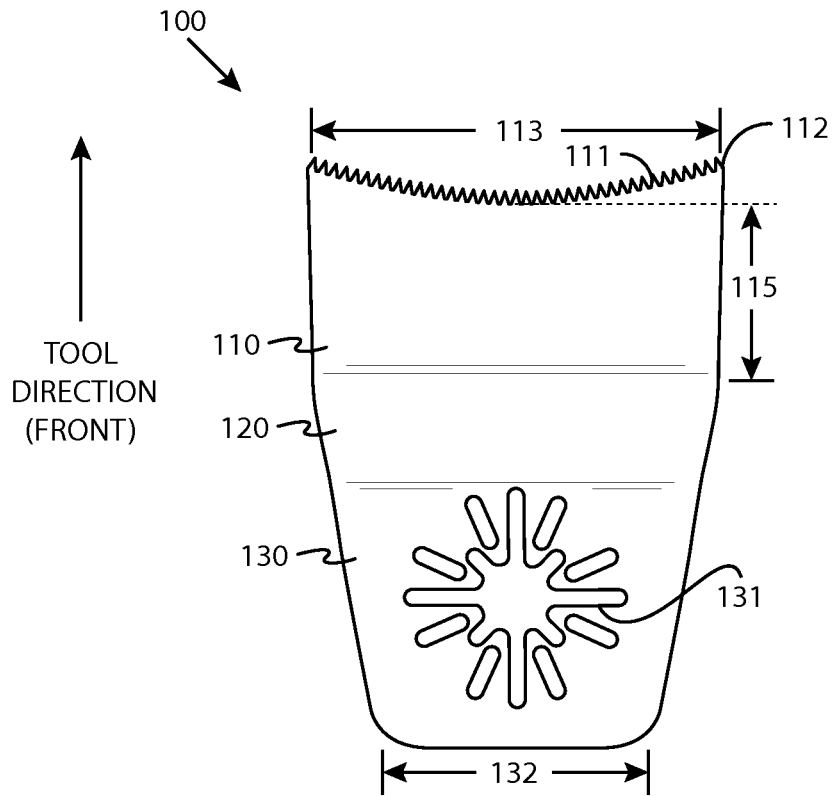
FIGS. 1A and 1B illustrate perspective views of an embodiment of a cutting head in accordance with aspects herein.

A concave saw blade according to the present invention may be used in connection with various tools facilitating the exchange of blades or tool heads. For example, an oscillating tool can be adapted to accept a plurality of heads, including cutting blades. Cutting blades with a single linear cutting surface may be inefficient or dangerous for cutting certain work pieces. In particular, a linear-only cutting surface can slip on curves or virtually any geometries to be cut, has no resistance to such slippage, and may only use a very small proportion of the cutting surface at a given point in a cycle if the cutting surface does not conform to the geometry of the work piece (e.g., flat blade on rounded work piece). Thus, a blade with a concave or angular recess can be employed on an oscillating tool. These are only examples, and references to particular functions herein should not be considered limiting.

In embodiments, the cutting surface can be serrated or include a cutting grit. Various saw tooth patterns, sizes and densities, as well as various grit materials, application techniques, and densities, and other factors can be used to create generalized or material- or geometry-specific cutting heads for oscillating tools.

To facilitate use on an oscillating tool, the cutting surface can be disposed in a direction substantially similar to the direction of the tool when mounted to the tool. This is distinct from, for example, circular or reciprocating cutting tools which employ different blade orientation and cutting techniques.

While particular materials (e.g., metals, plastics, and so forth) or means (e.g., serrations, grit cutters, and so forth) are discussed for use in the construction of various components herein, it is to be appreciated that materials or means described are interchangeable, and that such discussion is intended for purposes of example only. Descriptions of materials, dimensions, construction, and so forth are not exclusive or exhaustive, and, in embodiments, any suitable material or means can be employed.

As used herein, "front," "tool direction," or similar language generally refer to be a direction indicated to which the front of an oscillating tool is pointed. When the oscillating tool is used in conjunction with a saw blade, front is the tool's direction of travel and/or the direction through the object being cut. For example, when cutting a round pipe, a particular direction that can be referred to as the front can be a line orthogonal to a tangent at a point nearest the tool and/or where the blade contacts the work piece (or the center/average if multiple points of contact). While, when used with oscillating tools, the direction front will generally be self-evident from the saw blade's mounting to the tool, it is to be appreciated that it is possible to mount the blade in an alternative direction (e.g., rotated at an angle such that the direction defined by the length of the blade and the tool direction do not coincide) without departing from the scope herein. Unless denoted otherwise, angles described herein can be in reference to tool direction.

As used herein, "oscillating tool" or similar language generally refers to a tool that can mount at least an oscillating tool head as disclosed herein. An oscillating tool is distinct from other powered multi-tools in that it oscillates (e.g., rotates, translates, vibrates, combinations thereof) a blade or other tool head back and forth in a narrow arc (e.g., smaller than 10 degrees) or over a small distance (e.g., less than 5 millimeters) at a high cyclic rate (e.g., hundreds to tens of thousands of strokes per minute). If oscillating in a narrow arc, a tangent to the arc's neutral position (e.g., centered between extrema of movement) can be substantially perpendicular to the tool direction. If translating over a small distance, the direction(s) the tool head translates (e.g., the line of "back-and-forth") can be substantially perpendicular to the tool direction. Examples of oscillating tools include the Dremel® Multi-Max®, the Fein® Multimaster®, and various Black & Decker® oscillating multi-tools. Because a tool head extends away from (e.g., forward of) the body of an oscillating tool, as well as built-in mounting offsets or stepped tool head profiles, oscillating tools can be used in environments distinct from (e.g., more restrictive than) settings where other tools may be used. Oscillating tools are distinct from reciprocating tools (e.g., Milwaukee® Sawzall®), rotary tools, and others. For example, reciprocating tools reciprocate in the tool direction and cut orthogonally using an arcing stroke of the entire tool, and rotary tools typically remain in place or travel a linear path using a blade that rotates continuously rather than oscillating through a fixed cycle.

As used here, a "recess" can be a portion of a piece of material with a U-shape, V-shape, or other shape removed such that the sides of the piece of material extend further past at least a portion of the recess. Unless otherwise specified, the "sides" are a right and left side of the piece of material from an overhead view oriented lengthwise parallel to tool direction. Exterior portions of the piece of material can be, with reference to other portions, those closer to the sides. Recesses can be, for example, concave, angular, or combinations thereof. A concave recess can be described using a smooth curve (e.g., U-shape), while an angular recess can be described using lines or triangles (e.g., V-shape). A combination recess with concave and angular portions can include smooth curves and straight lines. One "end" or multiple "ends" can be the front and back of the piece of material when viewed from overhead and the material is viewed aligned with tool direction.

As used herein, "hollow," "framed," "cutaway," "skeleton," or similarly-termed portion can be used to indicate a framing or skeletal construction whereby portions necessary for the use and strength are included in a design, and portions or material that do not contribute to these functions (e.g., do not perform cutting or support the portions performing cutting) are excluded for purposes of saving weight during movement, saving material during fabrication, reducing friction during use, et cetera.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Features that are described and/or illustrated with respect to one embodiment may be used in the same way or in a similar way in one or more other embodiments and/or in combination with or instead of the features of the other embodiments. These and further aspects and features will be apparent with reference to the following description and attached drawings. In the description and drawings, particular embodiments of the subject innovation have been disclosed in detail as being indicative of some of the ways in which the principles of the subject innovation may be employed, but it is understood that the subject innovation is not limited correspondingly in scope. Rather, the subject innovation includes all changes, modifications and equivalents coming within the scope of the claims appended hereto. The accompanying illustrations are examples of the subject disclosure, but the innovation can appear in various embodiments depending on, for example, varying blade sizes and personal customizations that are not illustrated here.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs. It should be emphasized that the term "comprises/comprising" when used in this specification is taken to indicate the presence of stated features, integers, steps or components but does not preclude the presence or addition of one or more other features, integers, steps, components or groups thereof.

Figure 1B:
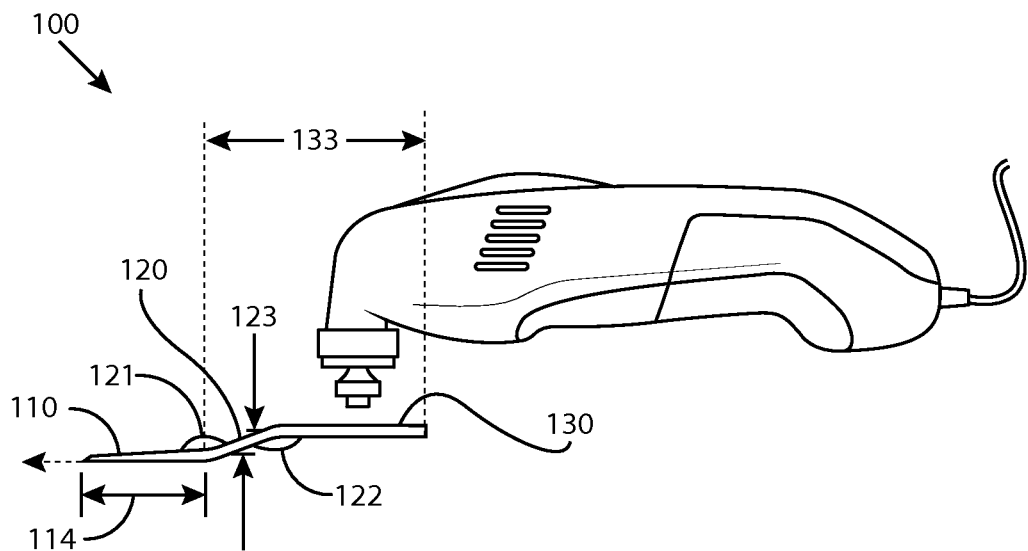

FIGS. 1A and 1B illustrate perspective views of an embodiment of a cutting head 100 in accordance with aspects herein. Cutting head 100 can include working plane 110, step plane 120, and interface plane 130. FIG. 1A can show an overhead view, while FIG. 1B can show a side-on view.

Working plane 110 is the portion of cutting head 100 that contacts a work piece (e.g., cylindrical or curved portion of pipe, portion of rod, and others). Working plane 110 can include a series of teeth 112 (or serrations) oriented on a concave that arcs toward step plane 120 and interface plane 130. This portion of working plane 110 can be concave blade 111, which can have the vertex of its curvature centered on working plane 110. The vertex of concave blade 111 is recessed with respect to sides (e.g., as viewed in FIG. 1A) of working plane 110. Put another way, a curve is logically "cut out" from working plane 110 to produce concave blade 111, resulting in a recess opposite the tool direction. While the language of "cut out" is employed here in an effort to thoroughly describe the shape of working plane 110 and concave blade 111, this should not be interpreted to imply that cutting is required or even preferred in the fabrication or development of embodiments herein such as cutting head 100.

Concave blade 111 can have a curvature. Curvature can be defined in a number of ways, but nothing herein should be interpreted to limit such curvature to specific values. For example, concave blade 111 can be semi-circular, whereby its curvature can be defined by a radius. Concave blade 111 can include various steeper or shallower curves than a particular radius, such as can be included in portions of ellipses or other shapes. Various other equations or measures can be used to define other curvature(s). Further, while portions herein describe concave blade 111 as having a symmetrical curve centered on working plane 110, alternative embodiments of concave blade 111 can be asymmetrical and/or involve curves with variable curvature and/or multiple vertices for particular uses. Finally, in embodiments, two or more vertices of a curve can be set into working plane 110 such that a curved blade can at least partially wrap around (e.g., blade can contact or surround more than 180 degrees of a work piece) a work piece to facilitate cutting.

Concave blade 111 can have teeth 112. Teeth 112 can be various embodiments of saw teeth, serrations, multi-dimensional patterns, cutting grit, or other textures that facilitate the cutting, tearing, grinding, or other reduction of a portion of a work piece to be physically separated from another portion via a linear cut. In the embodiment illustrated in FIG. 1A, teeth 112 are shown as symmetrical isosceles triangular (e.g., plain, mountain-grind) teeth that are angled along the curvature of concave blade 111. Angling with curvature is effected such that a hypothetical line bisecting the angle defined by the vertex farthest in the tool direction of each tooth is perpendicular to the curvature of concave blade 111 at the point where it intersects concave blade 111. While this is one embodiment of teeth 112, others can be used without departing from the scope or spirit of the innovation.

For example, teeth 112 can be cut to varying angles with respect to the tool direction or others. Teeth 112 need not be oriented to different angles, and in embodiments, the hypothetical lines bisecting the angles defined by the vertices farthest in the tool directions of each tooth can be parallel. Every tooth among teeth 112 need not be symmetrical in terms of geometry or orientation. For example, a reverse tooth pattern can be used. Various rip or crosscut designs can be employed in teeth 112. While FIG. 1A shows a plain grind (e.g., all teeth 112 would be symmetrical if concave blade 111 was "unrolled" to a linear arrangement), various other patterns can be used. For example, various tooth patterns or grinds that can be used in accordance with the herein can include ramp grind, M-shaped or crown tooth, lance tooth, perforated tooth, Great American tooth, Champion tooth, precision tooth, claw tooth, buttress tooth, flat-top grind, alternate top bevel, hi-alternate top bevel, triple chip grind, combination grind, conical flat tooth, hollow grind, spiral tooth pattern, micro-serrations and various other hook or rake patterns. While teeth 112 can be on concave blade 111, teeth 112 can include concave portions themselves, including one or more curvatures defining the cutting edge of a tooth or serration among teeth 112.

Various embodiments of concave blade 111 and teeth 112 can be designed for particular purposes or materials to be cut. For example, various teeth-per-inch (TPI) densities (e.g., teeth-per-inch) and patterns of teeth 112 can be employed. For example, blades intended for cutting wood can have approximately 25-35 TPI; plastic, 19-29 TPI; general metal, 15-25 TPI; aluminum, 13-23 TPI; drywall, 11-21 TPI; and concrete, 9-19 TPI. Various other materials can also be cut using a cutting grit. While these examples are provided to illustrate particular aspects, nothing related to particular configurations of teeth 112 or materials should be interpreted as exclusive or exhaustive, and other techniques can be employed without departing from the scope or spirit of the innovation.

Working plane 110 can have a working width 113 defined as the linear distance between the sides (e.g., as viewed in FIG. 1A). In embodiments, a work piece to be cut can have a dimension smaller (e.g., in diameter or other cross section) than working width 113. However, it is to be appreciated that the length of concave blade 111 along its curve is greater than working width 113. Further, in embodiments employing a shallow concave or low curvature, work pieces can be cut through a cross section larger than working width 113 while still yielding the benefits of the innovation by rotating cutting head 100 or the work piece through multiple cut directions.

Working plane 110 can have a maximum working depth 114 and a standard working depth 115 that can define the size of a cut made by cutting head 100 from a given direction. For example, turning to FIG. 1B, maximum working depth 114 is the distance from an edge of teeth 112 to the beginning of step plane 120 (or another portion) that prevents the blade from cutting deeper. In FIG. 1A, the standard working depth 115 is shown as the distance from a point where teeth 112 encounter a portion of the work piece to be cut to step plane 120. It is to be appreciated that any working depth can additionally be constrained by the orientation or environment of the work piece as well as the oscillating tool to which cutting head 100 is attached.

Cutting head 100 can further have step plane 120. Step plane 120 can be a plane at an angle to working plane 110 that provides a stepped profile for cutting head 100. Step plane 120 can encounter working plane 110 at first step angle 121. First step angle 121 can be the angle between two (e.g., top) surfaces of working plane 110 and step plane 120, and can be defined (e.g., in degrees, radians, mils, or others) with reference to the tool direction (e.g., where the surface of working plane 110 coincides with the tool direction).

Step plane 120 can further encounter interface plane 130 at second step angle 122. Second step angle 122 can be measured between two (e.g., bottom) surfaces of step plane 120 and interface plane 130, and can be defined with reference to the tool direction (e.g., where the surface of interface plane 130 coincides with the tool direction). Step plane 120 can, by providing relief or standoff between working plane 110 and interface plane 130, define step distance 123. Step distance 123 can be a minimum distance between an oscillating tool to which cutting head 100 is attached and working plane 110. In embodiments, step distance 123 can be measured excluding the respective thicknesses of at least working plane 110 and interface plane 130.

While FIG. 1B shows first step angle 121 and second step angle 122 as substantially equal (at least in magnitude), rendering working plane 110 and interface plane 130 substantially parallel, it is to be appreciated that in various embodiments first step angle 121 and second step angle 122 can be unequal, and working plane 110 and interface plane 130 can be nonparallel. Embodiments utilizing such configurations are included, for example, with FIGS. 3A and 3B.

Interface plane 130 can be a portion of cutting head 100 that connects to an oscillating tool. Interface plane 130 can have tool interface 131, which can include a pattern in interface plane 130 that accepts or mates with a pattern used by one or more oscillating tools to retain at least cutting head 100. Various holes, threads, pins, et cetera, associated with tool interface 131 can provide support for the use of cutting head 100.

Interface plane 130 can include dimension interface width 132. In embodiments, interface width 132 is of different width than working width 113 or another width at various portions of cutting head 100. As illustrated in FIG. 1 and elsewhere, cutting head 100 can taper or flare in multiple dimensions (e.g., depending on an oscillating tool to which cutting head 100 is configured for use with) without departing from the scope or spirit of the innovation.

Figures 2A, 2B:
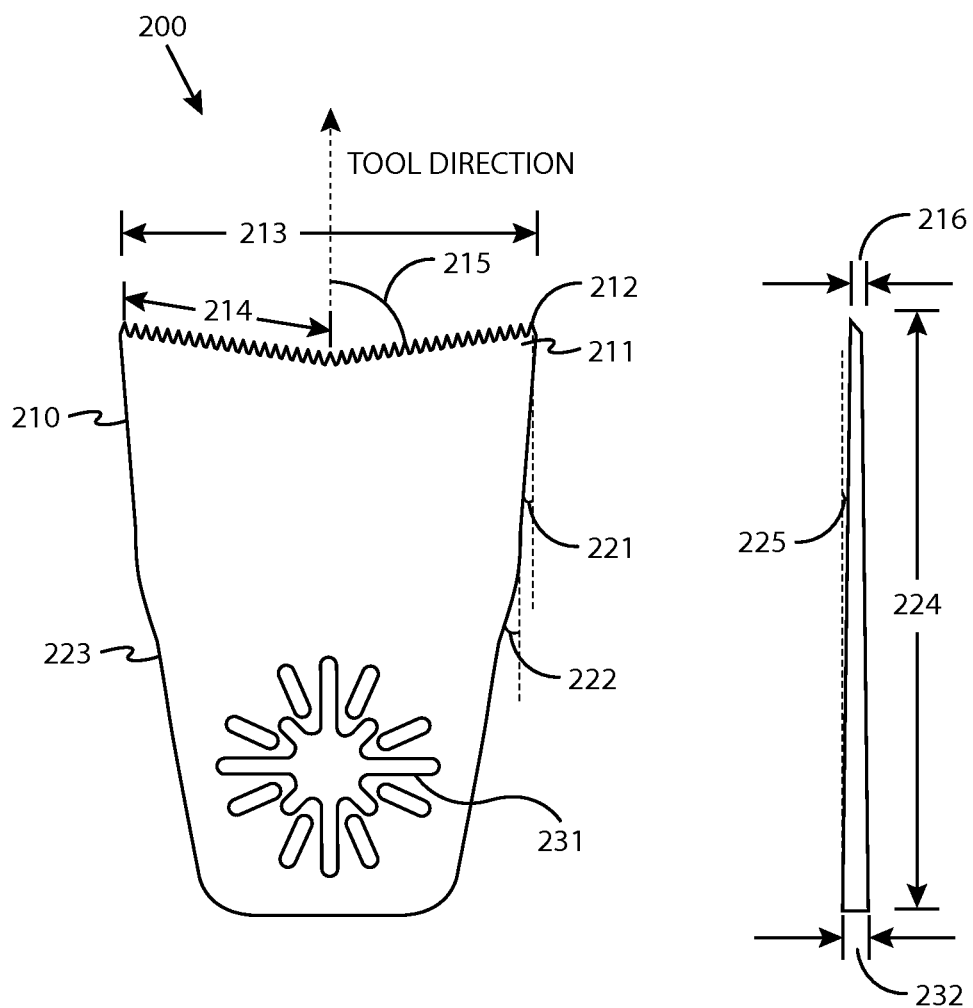
FIGS. 2A and 2B illustrate another embodiment of a cutting head in accordance with aspects herein.

Turning now to FIGS. 2A and 2B, illustrated is another embodiment of serrated cutting head 200 in accordance with aspects herein. While FIGS. 1A and 1B illustrate cutting head 100 with concave blade 111 (e.g., a curved radius blade), teeth 112 at unequal angles, and cutting head 100 having a stepped profile, FIGS. 2A and 2B illustrates alternative embodiments including angular blade 211, teeth 212, and a flat profile.

Serrated cutting head 200 can have an angular blade 211 that includes a notch, V-shape, or other recess defined by two straight lines across head plane 210. While angular blade 211 is shown with the intersection of the two lines defining angular blade 211 centered on head plane 210, where the blade has two sides defined by each line.

Angular blade 211 can be more specifically described according to section length 214 and blade angle 215. Section length 214 can be the length of one side of angular blade 211 (different in value than the corresponding portion of working width 213), and blade angle 215 can be the angle between the tool direction and one side of angular blade 211. As illustrated in FIG. 2A, angular blade 211, and serrated cutting head 200, are symmetrical.

It is appreciated that various alternative embodiments can include asymmetrical or other orientations. For example, the intersection of the sides of angular blade 211 need not be centered on head plane 210.

Various angles can define the geometry of serrated cutting head 200. Working taper angle 221 can define the rate at which head plane 210 initially tapers away from angular blade 211 with respect to the tool direction. Transition taper angle 222 can define a different angle for a portion of head plane 210 closer to interface 331. In embodiments, working taper angle 221, transition taper angle 222, and other tapering angles can be of different values such that one or more portions of serrated cutting head 200 flares instead of tapers.

The thickness of a head or portion thereof herein can also taper. For example, thickness taper angle 235 illustrates how a portion of serrated cutting head 200 can transition from cutting thickness 216 to interface thickness 232. In embodiments, various thickness tapers can be employed with serrated cutting head 200 to facilitate various strength, wear, and/or cutting requirements for particular applications. For example, a thin-to-thick taper can facilitate smoother cutting of dense materials, while a thick-to-thin taper can facilitate longer life of angular blade 211 in less dense materials.

Various curves can be used in place of straight lines or angles in the design of serrated cutting head 200. For example, head plane curve 223 can allow a portion (e.g., working portion) of head plane 210 to curve into another portion (e.g., interface portion). Herein, where multiple planes meet, or at edges defining the shape of one or more heads or subcomponents thereof, it is to be appreciated that curves can be employed alternative to or in combination with straight edges and angles defined by intersections thereof without departing from the scope or spirit of the innovation.

Serrated cutting head 200 can have a length 224. Length 224 can include a longest dimension, although an end-to-end dimension of one or more notional lines through serrated cutting head 200 can be different (e.g., vertex of angular blade 211 to farthest edge beyond interface 231) in terms of a length measurement. In embodiments, a working depth of serrated cutting head 200 is only limited by dimensions of an oscillating tool, and it is possible for serrated cutting head 200 to potentially cut to a depth of (or of nearly) a distance between angular blade 211 and a nearest point of interface 231.

Figure 3A:
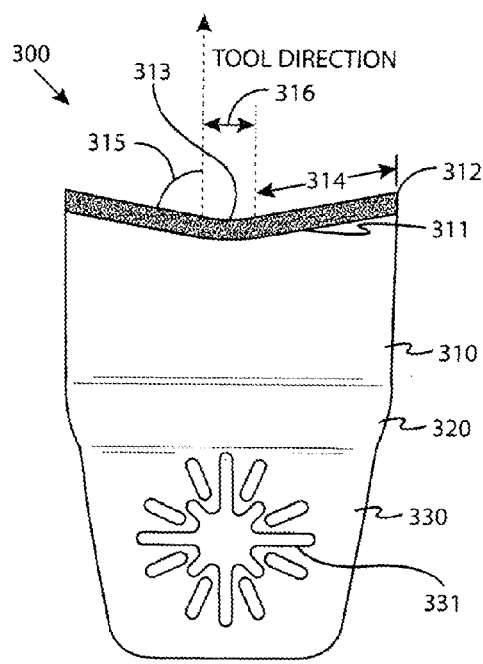
FIGS. 3A and 3B illustrate is an embodiment of a grit cutting head in accordance with aspects herein.
Figure 3B:
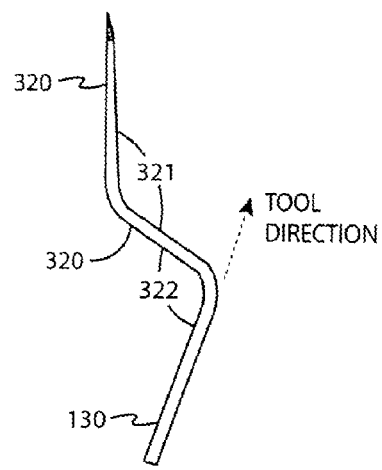

Turning now to FIGS. 3A and 3B, illustrated is an embodiment of a grit cutting head 300 in accordance with aspects herein. Grit cutting head 300 can include working plane 310, step plane 320 and interface plane 330. Unlike cutting head 100 and serrated cutting head 200, grit cutting head 300 can employ a cutting grit 317 in lieu of a serrated edge (e.g., teeth 112 and/or teeth 212).

Grit cutting head 300 can further include a curve-angle combination blade 311 that includes both a curved section 313 and one or more angular sections 312. Angular section(s) 312 can be defined by section length 314 and blade angle 315. In embodiment including two or more angular section(s) 312, it is not necessary for each respective section length 314 and/or blade angle 315 to be equal (e.g., a symmetrical grit cutting head 300) as illustrated in FIG. 3A.

The curved section 313 of curve-angle combination blade 311 can be defined at least by a curvature (e.g., equation describing curve, radius, curve through series of points, and others) and a distance dimension (e.g., curve cross section 316, length of curve, and others).

Step plane 320 can be defined, at least in part, by first step angle 321 and second step angle 322. In the embodiment illustrated in FIG. 3B, first step angle 321 and second step angle 322 are unequal, resulting in not only a linear distance offset between working plane 310 and interface plane 330, but also an angular offset. Thus, when interface 331 is attached to an oscillating tool, working plane 310 can operate at an angle to a tool plane defined at least in part by the tool direction and a line through interface plane 330. Various embodiments including unequal first step angle 321 and second step angle 322 can be used, for example, in particular functions where work piece environment, desired cut angle, and/or tool geometry may otherwise prevent an operator from achieving a desired cut. In embodiments, an oscillating tool used in conjunction with tool heads described can include a level to facilitate consistent cutting.

Various embodiments of curve-angle combination blade 311 and cutting grit 317 can be designed for particular purposes or materials to be cut. Various grit materials can be employed in accordance with the herein based on a particular application. For example, a diamond-coated grit can be used to cut stone; a carbide-based grit can be used to cut general solid surfaces; and carbide teeth can be used to cut laminate. In embodiments, two or more grit types (e.g., diamond and carbide) can be used. While these examples are provided to illustrate particular aspects, nothing related to particular grits or materials should be interpreted as exclusive or exhaustive, and other techniques can be employed without departing from the scope or spirit of the innovation.

Figure 4A:
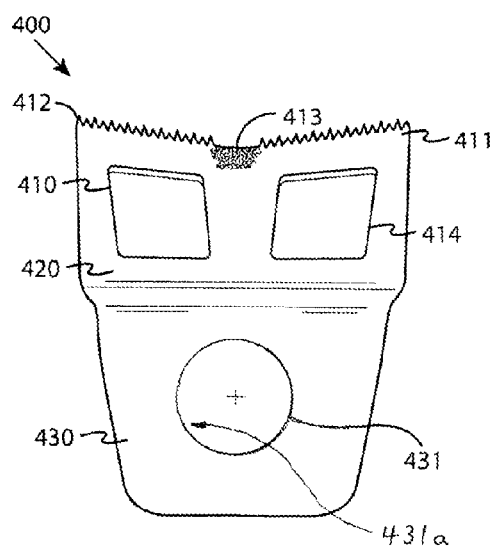
FIGS. 4A and 4B illustrate an embodiment of a combination cutting head that can include a serrated-grit cutting edge in accordance with aspects herein.
Figure 4B:
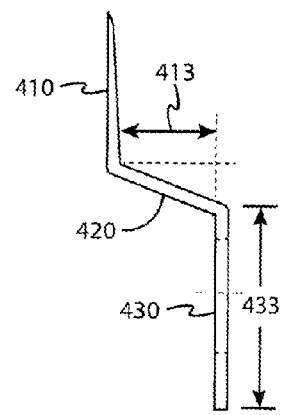

Turning now to FIGS. 4A and 4B, illustrated is an embodiment of combination cutting head 400 that can include a serrated-grit cutting edge 411 with cutting grit 413 and cutting serrations 412 in accordance with embodiments herein. Combination cutting head 400 can include working plane 410, step plane 420, and interface plane 430.

Working plane 410 can include serrated-grit cutting edge 411. Cutting serrations 412 can include alternating (or other patterns of) asymmetrical teeth in the illustrated embodiment. Cutting serrations 412 can be symmetrical in other embodiments (not pictured). Further, cutting grit 413 can comprise a portion of serrated-grit cutting edge 411 that does not include serrations. While, in the illustrated embodiment of FIG. 4A, cutting serrations 412 and cutting grit 413 are pictured at over different portions of serrated-grit cutting edge 411, alternatives can be practiced without departing from the scope or spirit of the innovation. In embodiments (not pictured), cutting grit 413 and cutting serrations 412 can overlap, permitting a combined serrated-grit surface on a single portion of serrated-grit cutting edge 411.

Combination cutting head 400 can include step offset 413, the distance from an oscillating tool facilitated by step plane 420. Combination cutting head 400 can further include forward offset 433, a forward distance from at least a portion of a connector for an oscillating tool that interacts with interface 431 facilitated by interface plane 430 and step plane 420. In embodiments, at least one of step offset 413 and forward offset 433 can be designed based at least in part on one or more oscillating tools with which combination cutting head 400 can be used. In alternate embodiments, one or more portions of combination cutting head 400 can be designed for particular work pieces or associated environments (e.g., 3-inch pipe already installed to a narrow frame).

In embodiments of combination cutting head 400 or other heads disclosed herein, one or more portions (e.g., working plane 410, step plane 420, interface plane 430) of the apparatus can be of framed or skeleton form. For example, combination cutting head 400 includes frame-outs 414, which can be hollow portions of working plane 410. Frame-outs 414 can be included in cutting head 400, for example, to reduce friction during cutting, to reduce the weight of a head, or to reduce the cost or material used in a head. Various other framed or skeleton portions can be employed on other parts of combination cutting head 400 (e.g., step plane 420, interface plane 430) without departing from the scope or spirit of the innovation disclosed herein.

While the oscillating tool head designs described above illustrate particular aspects and combinations thereof, nothing herein is intended to prevent various alternative or complementary combinations of aspects. For example, it is not necessary for a combination serrated-grit cutting edge to have any particular portion include grit and/or serrations. Nor is it required to use a curve-angle combination blade with a cutting grit to employ a head with unequal step angles. A curve-angle combination blade can be used with serrations, and a cutting grit can be used with a curved or angular recess. Any combination of geometries or means expressly or inherently described herein are combinable unless specifically denoted otherwise. The illustrated embodiments are intended to show a wide variety of possible embodiments to provide a sense of the spirit of the innovation, rather than an exhaustive listing. Further, while the illustrated embodiments relate to heads that are symmetrical about at least one axis, those of ordinary skill in the art will appreciate alternative techniques that can be practiced without departing from the scope of the disclosure.

Figure 5:
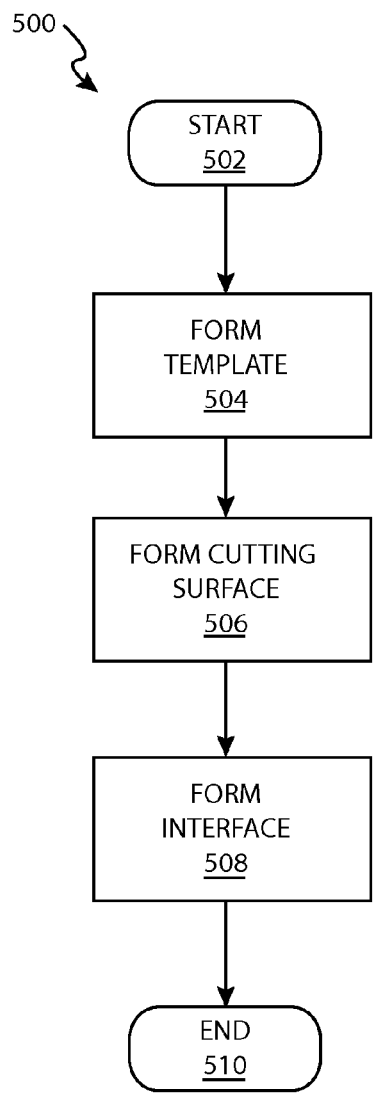
FIG. 5 illustrates a flow chart of an example methodology for manufacturing a concave cutting head in accordance with aspects herein.

Turning now to FIG. 5, illustrated is a flow chart of an example methodology 500 for manufacturing a concave cutting head in accordance with the disclosures herein. Methodology 500 can start at 502 and proceed to form a cutting head template at 504. In embodiments, forming a cutting head template can include creating at plane or series of connected planes of a head material. One or more plane blanks for use in a cutting head can be formed by mechanical cutting, weld cutting, laser cutting, stamping, extruding, molding, forging, grinding, machining, and other techniques appropriate for use in creating, shaping or modifying a cutting head template material. In embodiments, emerging technologies such as three-dimensional printing can be employed without departing from the scope or spirit of the innovation. Those of regular skill in the art will appreciate other suitable techniques, or combinations of techniques, for this and other portions of methodology 500.

Forming of the cutting head template at 504 can further include bending a single plane blank to two or more planes. Alternatively, forming of the cutting head can include attaching a plurality of plane blanks to produce a cutting head template of two or more planes. Attaching can include, but is not limited to, welding, soldering, application of epoxy or other adhesives, application of hardware (e.g., pins, screws, nuts), stitching, and others, or combinations thereof.

Cutting head template materials can include, but need not be limited to, metals and alloys (including carbides), polymers, high density polyethylene, diamond, ceramics, and other suitable materials, or composites and/or combinations thereof.

After the cutting head template is formed at 504, methodology 500 can proceed to 506 where a cutting surface can be formed. Forming of the cutting surface can include, for example, the formation of a concave, angular, or combination concave-angular cutting surface on the cutting head template (e.g., by cutting, welding, bending, and so forth). The cutting surface can include, for example, various patterns of teeth or serrations as described herein. Serrations or teeth can be cut into the cutting head template along the cutting surface. Alternatively, pre-formed serrations or teeth can be applied by welding, epoxy, installed hardware, et cetera. If the cutting surface includes a cutting grit or other abrasives (e.g., with or without serrations), the cutting grit can be applied using appropriate adhesive, bonding, welding, and soldering techniques, as well as others commonly in practice for applying cutting grits or similar products to a substantially planar template.

At 508, an interface can be formed. Interface 508 can be formed by adding, removing, or modifying material on a cutting head template. For example, a pattern can be cut (e.g., mechanical, weld, laser), grinded, bent, punched, stamped, affixed, and/or otherwise created or applied to a portion of the cutting head template appropriate in relation to the cutting surface. The pattern (or other portions of the interface) can be configured to couple with a connection pattern for an oscillating tool or other device such that the formed with appropriate tolerances such that the concave cutting head is removable but adequately supported to substantially reflect the motion of the oscillating tool's drive mechanism. After forming the interface at 508, methodology 500 can end.

In various embodiments, aspects of methodology 500 can be performed in orders different from that illustrated in FIG. 5 (e.g., interface formed before cutting surface), combine illustrated aspects (e.g., template and cutting surface formed simultaneously), or include aspects not illustrated as distinct (whether expressly recited or inherent).

Figure 6:
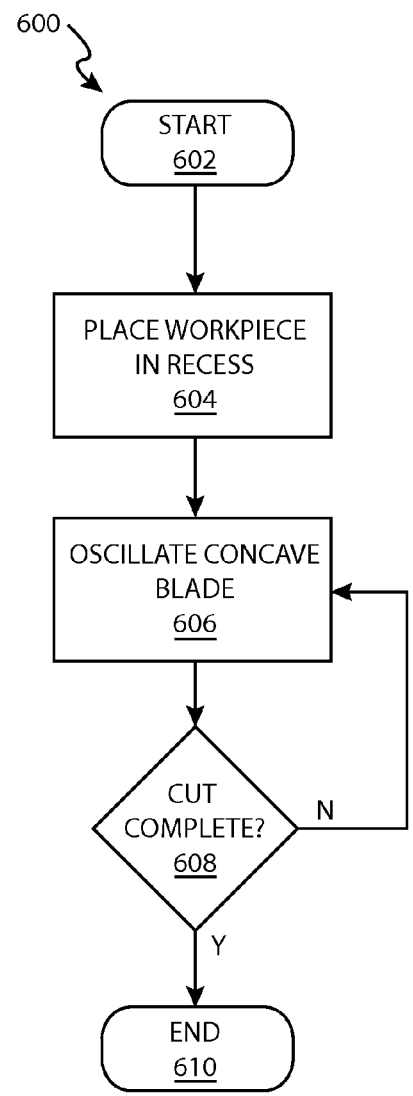
FIG. 6 illustrates a flow chart of an example methodology 600 for cutting a work piece with a concave blade in accordance with aspects herein.

FIG. 6 illustrates a flow chart of an example methodology 600 for cutting a work piece with a concave blade disposed toward the front of an oscillating device. Methodology 600 starts at 602 and proceeds to 604 when the work piece is placed in the recess of a concave blade (or the recess of the concave blade is moved to the work piece). In embodiments, at least a portion of the work piece can be centered on the blade (e.g., primary or initial point of contact with a primary or initial point to cut is the vertex of the curve of the blade). Alternatively, or in embodiments where the blade is asymmetrical, other configurations can be employed.

At 606, the concave blade can be oscillated. In embodiments, oscillation includes small rotation (e.g., fewer than 10 degrees for complete arc of stroke) or translation (e.g., less than 5 millimeters for complete stroke) in a back-and-forth motion at cyclic rates over 200 strokes per minute. The cyclic rate can be dependent on the oscillating device employed. In additional embodiments, the cyclic rate can be limited by the specifications of the concave blade and/or the material being cut. In particular embodiments, the cyclic rate can be in excess of 20,000 strokes per minute.

At 608, a determination is made whether the cut is complete. The cut can be complete, for example, when a predetermined depth is reached, when the work piece is cut through, or on other conditions. In embodiments, various machine techniques can be used to determine if the cut is complete in automated systems. For example, machine vision can be used to observe depth, and/or mechanical actuators (e.g., pressure switch mounted on oscillating machine associated with particular blade depth) can be employed to trigger various subsequent or related aspects. Various motion sensors, scales, laser eyes, force meters, and other measuring devices can also be employed to determine whether a cut is complete. If the cut is determined to be incomplete, methodology 600 can continue oscillate at 606. After the cut is complete at 608, methodology 600 can advance to end at 610.

In embodiments, methodology 600 can further include an aspect (not illustrated) of moving the work piece or the concave blade during the cut. For example, if a work piece cross section is dimensionally larger than the working depth of a concave blade, the concave blade can still be employed to cut the work piece so long as the working depth is more than one-half the cross section of the work piece. Thus, by rotating the work piece or the cutting blade to continue the cut from a different angle, the work piece can be cut through. In embodiments, a single cut approach can be used, such that the blade or work piece is rotated while cutting occurs. In embodiments, a multiple cut approach can be used, such that two or more cuts are made from different angles, where the single cuts are substantially on a single plane and meet within the work piece to complete the cut through.

While methodology 600 is directed toward the use of a concave blade, it is to be appreciated that methodology 600 includes in its scope the use of any blade as disclosed herein, including angular and/or angular-concave combination blades including serrations, cutting grit, or both.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A cutting head for use with an oscillating tool, comprising:
    a concave cutting edge oriented to a front direction of the oscillating tool;
    an interface configured to facilitate attachment of the cutting head and the oscillating tool;
    wherein at least a center portion of the cutting edge is concave, and at least one exterior portion of the cutting edge is angular;
    wherein the center concave portion of the cutting edge includes a cutting grit between two or more serrations; and
    wherein no cutting grit is on the two or more serrations.

2. The cutting head of claim 1, wherein the cutting grit includes two or more grit types.

3. The cutting head of claim 1, further comprising a step plane that offsets the cutting edge from the interface in at least one direction.

4. The cutting head of claim 1, wherein the cutting edge has a first thickness, and the interface has a second thickness, the first thickness is not equal to the second thickness.

5. An apparatus, comprising:
    a working plane including a concave cutting portion, wherein the concave cutting portion is oriented on a tool direction end of the working plane, wherein the cutting concave portion has applied a cutting grit between two or more serrations, and wherein no cutting grit is on the two or more serrations;
    an interface plane including at least an oscillating tool interface configured to couple the apparatus to an oscillating tool; and
    a step plane disposed between the working plane and the interface plane including a first step angle and a second step angle that offsets the working plane from the interface plane; and wherein at least a center portion of the cutting concave portion is concave, the center concave portion includes the cutting grit between two or more serrations, and at least one exterior portion of the cutting concave portion is angular.

6. The cutting head of claim 1, wherein the cutting edge is adapted particularly to cutting inorganic material.

7. The cutting head of claim 6 wherein the cutting edge is made with a saw tooth pattern, a grit size, a grit density, a grit material, a grit application technique, or combinations thereof which adapt the cutting edge particularly to cutting inorganic material.

8. The cutting head of claim 6 wherein the cutting edge is adapted particularly to cutting metal.

9. The cutting head of claim 6 wherein the cutting edge is adapted particularly to cutting plastic.

10. The cutting head of claim 1 wherein the cutting edge comprises a grit bonded thereon.

11. The cutting head of claim 10, wherein the grit includes at least one of a carbide and diamond material.

12. The cutting head of claim 1, wherein at least one of the two or more serrations is formed from a carbide material.

13. The cutting head of claim 1 wherein the center portion of the cutting edge comprises the cutting grit and the exterior portion of the cutting edge comprises the two or more serrations.

\* \* \* \* \*

UNITED STATES PATENT AND TRADEMARK OFFICE
CERTIFICATE OF CORRECTION

| | | |
|---|---|---|
| PATENT NO. | : 9,522,432 B2 | Page 1 of 1 |
| APPLICATION NO. | : 13/792315 | |
| DATED | : December 20, 2016 | |
| INVENTOR(S) | : Staub | |

It is certified that error appears in the above-identified patent and that said Letters Patent is hereby corrected as shown below:

In the Claims

Column 12, Line 42 Claim 1 - delete "the center concave portion of"

Column 13, Lines 2-3 Claim 5 - delete ", the center concave portion includes the cutting grit between two or more serrations"

Signed and Sealed this
Fourth Day of July, 2017

Joseph Matal
*Performing the Functions and Duties of the*
*Under Secretary of Commerce for Intellectual Property and*
*Director of the United States Patent and Trademark Office*